US012526245B2

(12) United States Patent
Su et al.

(10) Patent No.: US 12,526,245 B2
(45) Date of Patent: Jan. 13, 2026

(54) BYPASS SWITCH DEVICE WITH INDICATING FUNCTION, ETHERNET NETWORK MODULE AND NETWORK APPLIANCE

(71) Applicant: Lanner Electronics Inc., New Taipei (TW)

(72) Inventors: Chung-Jen Su, New Taipei (TW); Yu-Min Meng, New Taipei (TW); You-Cheng Liao, New Taipei (TW); Lan-Feng Chen, New Taipei (TW); Ming-Ting Ken, New Taipei (TW)

(73) Assignee: Lanner Electronics Inc., New Taipei (TW)

( * ) Notice: Subject to any disclaimer, the term of this patent is extended or adjusted under 35 U.S.C. 154(b) by 771 days.

(21) Appl. No.: 17/824,576

(22) Filed: May 25, 2022

(65) Prior Publication Data
US 2023/0300088 A1 Sep. 21, 2023

(30) Foreign Application Priority Data
Mar. 16, 2022 (TW) .................................. 111109551

(51) Int. Cl.
| | |
|---|---|
| *H04L 49/351* | (2022.01) |
| *H01R 13/514* | (2006.01) |
| *H01R 13/717* | (2006.01) |
| *H01R 24/64* | (2011.01) |
| *H04L 49/40* | (2022.01) |
| *H01R 12/75* | (2011.01) |
| *H01R 107/00* | (2006.01) |

(52) U.S. Cl.
CPC ......... *H04L 49/351* (2013.01); *H01R 13/514* (2013.01); *H01R 13/7175* (2013.01); *H01R 24/64* (2013.01); *H04L 49/40* (2013.01); *H01R 12/75* (2013.01); *H01R 2107/00* (2013.01)

(58) Field of Classification Search
None
See application file for complete search history.

(56) References Cited

U.S. PATENT DOCUMENTS

| | | | | |
|---|---|---|---|---|
| 6,512,768 B1 * | 1/2003 | Thomas | .................. | H04L 45/02 370/235 |
| 2003/0219025 A1 * | 11/2003 | Choi | ........................ | H04L 1/22 370/217 |
| 2005/0106941 A1 * | 5/2005 | Witchey | .................. | H04L 69/08 439/620.09 |

* cited by examiner

*Primary Examiner* — Angela Nguyen

(57) ABSTRACT

A bypass switch device with indicating function is disclosed. The bypass switch device is for use in a network appliance having at least one Ethernet network module, and comprises N switch units and a microcontroller. The microcontroller is configured to change the switching state of at least two said switch units in case the Ethernet network module fails to work normally, such that at least two RJ45 connectors directly communicate with each other through at least two said switch units. In such case, the microcontroller simultaneously controls one of two LED components included by one said RJ45 connector and one of two LED components included by another one said RJ45 connector, such that the two LED components emit lights for indicating that the Ethernet network module is working in a bypass mode.

6 Claims, 6 Drawing Sheets

BYPASS SWITCH DEVICE WITH INDICATING FUNCTION, ETHERNET NETWORK MODULE AND NETWORK APPLIANCE

BACKGROUND OF THE INVENTION

1. Field of the Invention

The present invention relates to the technology field of network appliances, and more particularly to a bypass switch device with indicating function and a network appliance having the same.

2. Description of the Prior Art

It is well known that a network appliance, e.g., switch, router, gateway, and server, commonly includes at least one Ethernet network module that has multiple RJ45 connectors.

FIG. 1 shows a first stereo diagram of a conventional network appliance having multiple Ethernet network modules, and FIG. 2 depicts a block diagram of one Ethernet network module. As FIG. 1 shows, the conventional network appliance 1a commonly includes at least one Ethernet network module 11a. Moreover, as FIG. 2 shows, the conventional Ethernet network module 11a commonly comprises a signal transmission controlling chip 110a, a first RJ45 connector 111a, a second RJ45 connector 112a, a first transformer 115a, and a second transformer 116a. In which, the signal transmission controlling chip 110a is a PHY chip or a chip integrated with MAC module and PHY module therein. It is worth mentioning that, the Ethernet network module 11a shown in FIG. 2 has been disclosed by China Patent No. CN102340418B.

As FIG. 2 shows, the first RJ45 connector 111a and the second RJ45 connector 112a both have a right LED component (the gray one) and a left LED component. As described in more detail below, after a first RJ45 connector plug is connected to the first RJ45 connector 111a, the signal transmission controlling chip 110a controls the right LED component to constantly emit a green light. Moreover, in case the signal transmission controlling chip 110a transmits data to or receives data from the first RJ45 connector plug through the first RJ45 connector 111a, the signal transmission controlling chip 110a controls the left LED component to emit a flickering yellow, orange or green light. Similarly, after a second RJ45 connector plug is connected to the second RJ45 connector 112a, the signal transmission controlling chip 110a controls the right LED component to constantly emit a green light. Moreover, in case the signal transmission controlling chip 110a transmits data to or receives data from the second RJ45 connector plug through the second RJ45 connector 112a, the signal transmission controlling chip 110a controls the left LED component to emit a flickering yellow, orange or green light.

It is worth noting that FIG. 2 depicts the Ethernet network module 11a further comprises a first relay 113a, a second relay 114a and a relay controller 117a. By such arrangements, in case the signal transmission controlling chip 110a fails to normally work due to thermal shutdown or sudden power loss, the relay controller 117a controls the first relay 113a and the second relay 114a to conduct electrical connection switching, so as to make the first RJ45 connector 111a and the second RJ45 connector 112a be allowed to directly transmit data to each other. Therefore, the circuit constituted by the first relay 113a, the second relay 114a and the relay controller 117a is called Ethernet bypass circuit.

In real case, said Ethernet bypass circuit starts to work as the network appliance 1a is abnormal or has malfunction, so as to make the first RJ45 connector 111a and the second RJ45 connector 112a be allowed to directly transmit data to each other. However, in such case the left LED component and/or the right LED component of the first RJ45 connector 111a and/or the second RJ45 connector 112a not emit a specific light for indicating that the network appliance 1a is working in a bypass mode.

FIG. 3 shows a second stereo diagram of the conventional network appliance. As FIG. 3 shows, the conventional network appliance 1a is designed to further comprise two indicator lights 12a. By such design, in case there is one of the multiple Ethernet network module 11a working in the bypass mode, one indicator light 12a is controlled to emit a specific light. Moreover, if there are two Ethernet network modules 11a working in the bypass mode at the same time, two indicator lights 12a are both lighted up. However, it is a pity that the above-mention method exhibits some disadvantages in practical use, and the disadvantages are as follows. First, it needs to change the design of the housing case of the network appliance 1a, so as to make the two indicator light 12a be exposed out of a base of the housing case through two corresponding openings that are formed on the base. Second, the adding of the two indicator light 12a causes the manufacturing cost of the network appliance 1a be increased.

According to above descriptions, it is understood there is still room for improvement in the conventional Ethernet bypass circuit. In view of that, inventors of the present application have made great efforts to make inventive research and eventually provided a bypass switch device with indicating function for use in a network appliance having at least one Ethernet network module.

SUMMARY OF THE INVENTION

The primary objective of the present invention is to disclose a bypass switch device with indicating function for use in a network appliance having at least one Ethernet network module. The bypass switch device comprises N number of switch units and a microcontroller, wherein the microcontroller is configured to change the switching state of at least two said switch units in case the Ethernet network module fails to work normally, such that at least two RJ45 connectors are allowed to communicate with each other through at least two said switch units. In such case, the microcontroller simultaneously controls one of two LED components included by one said RJ45 connector and one of two LED components included by another one said RJ45 connector, such that the two LED components emit lights for indicating that the Ethernet network module is working in a bypass mode.

For achieving the primary objective mentioned above, the present invention provides an embodiment of the bypass switch device, which is integrated in an Ethernet network module comprising a signal transmission controller, N number of transformers and N number of RJ45 connectors; wherein N is an integer equal to or greater than 2, each said RJ45 connector includes a first LED component and a second LED component, and the bypass switch device comprises:

N number of switch units, wherein each said switch unit has a control terminal, a first terminal coupled to one said transformer, a second terminal coupled to one said RJ45 connector, and a third terminal coupled to one said switch unit; and a microcontroller, being coupled to the signal transmission controller and the N number of RJ45 connectors, and being also coupled to N said control terminals of the N number of switch units;

wherein the microcontroller is configured for:

switching at least two said switch units from a first switching state to a second switching state in case the signal transmission controller fails to work normally, so as to make at least two said RJ45 connectors be allowed to directly communicate with each other; and simultaneously lighting up said first LED component belong to one of two said RJ45 connectors directly communicating with each other as well as said second LED component belong to another one said RJ45 connector, so as to indicate that the Ethernet network module is working in a bypass mode.

Moreover, the present invention simultaneously provides an embodiment of an Ethernet network module, which is integrated in a network appliance, and comprises a signal transmission controller, N number of transformers and N number of RJ45 connectors; wherein N is an integer equal to or greater than 2, and each said RJ45 connector includes a first LED component and a second LED component; characterized in that the Ethernet network module further comprises a bypass switch device, and the bypass switch device comprises:

N number of switch units, wherein each said switch unit has a control terminal, a first terminal coupled to one said transformer, a second terminal coupled to one said RJ45 connector, and a third terminal coupled to one said switch unit; and a microcontroller, being coupled to the signal transmission controller and the N number of RJ45 connectors, and being also coupled to N said control terminals of the N number of switch units;

wherein the microcontroller is configured for:

switching at least two said switch units from a first switching state to a second switching state in case the signal transmission controller fails to work normally, so as to make at least two said RJ45 connectors be allowed to directly communicate with each other; and simultaneously lighting up said first LED component belong to one of two said RJ45 connectors directly communicating with each other as well as said second LED component belong to another one said RJ45 connector, so as to indicate that the Ethernet network module is working in a bypass mode.

In one embodiment, said switch unit is selected from a group consisting of relay and signal switching chip.

In one embodiment, the microcontroller is integrated with a trigger unit therein, and the trigger unit enables the microcontroller to switch at least two said switch units from the first switching state to the second switching state in case the signal transmission controller fails to work normally.

In one practicable embodiment, the trigger unit is a watchdog timer for monitoring whether the microcontroller periodically receive a specific signal from the signal transmission controller.

In another one practicable embodiment, the trigger unit is a voltage detector for monitoring whether a working voltage supplied to the signal transmission controller is in a normal range.

Furthermore, the present invention simultaneously provides an embodiment of a network appliance including at least one said Ethernet network module according to the present invention.

BRIEF DESCRIPTION OF THE DRAWINGS

The invention as well as a preferred mode of use and advantages thereof will be best understood by referring to the following detailed description of an illustrative embodiment in conjunction with the accompanying drawings, wherein.

DETAILED DESCRIPTION OF THE PREFERRED EMBODIMENTS

To more clearly describe a bypass switch device with indicating function for use in a network appliance having at least one Ethernet network module according to the present invention, embodiments of the present invention will be described in detail with reference to the attached drawings hereinafter.

Figure 1:
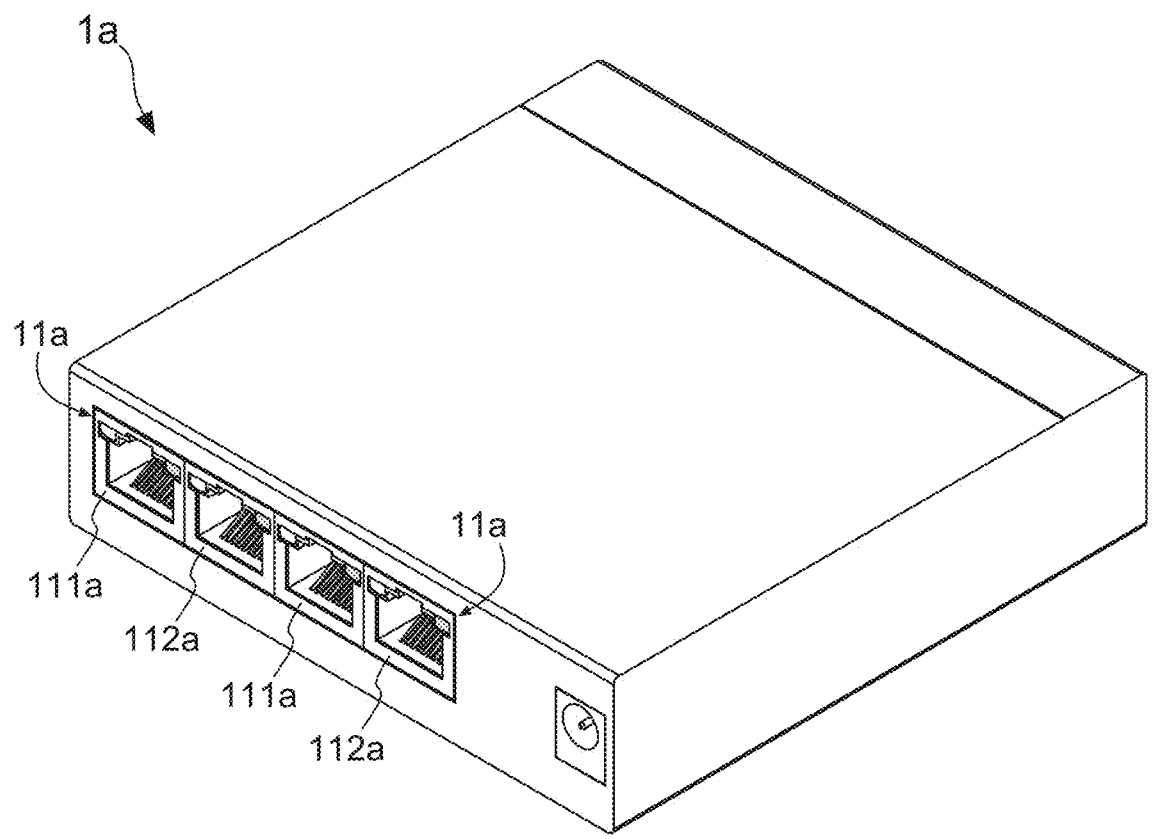
FIG. 1 shows a first stereo diagram of a conventional network appliance having multiple Ethernet network modules.
Figure 2:
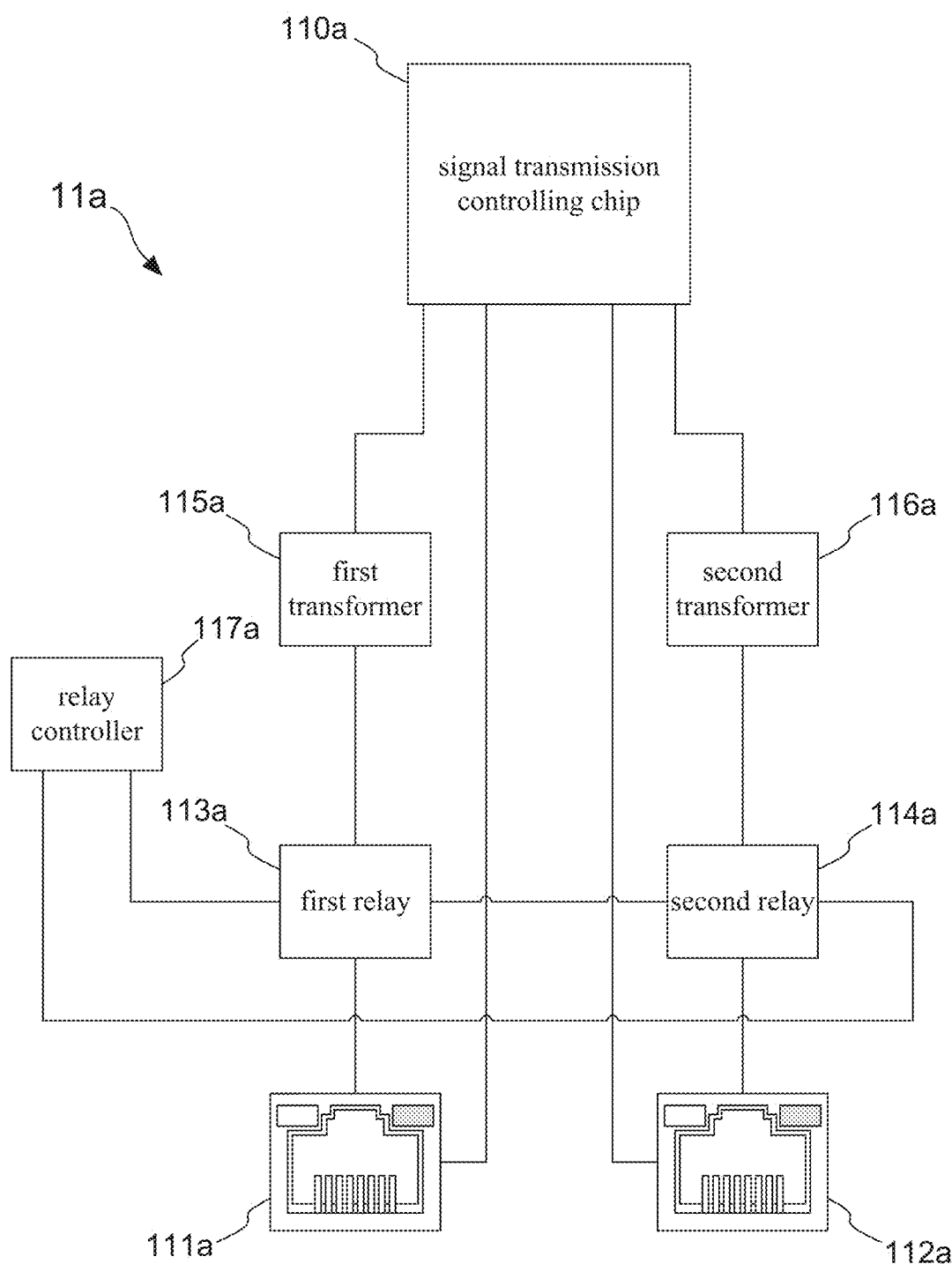
FIG. 2 shows a block diagram of the Ethernet network module.
Figure 3:
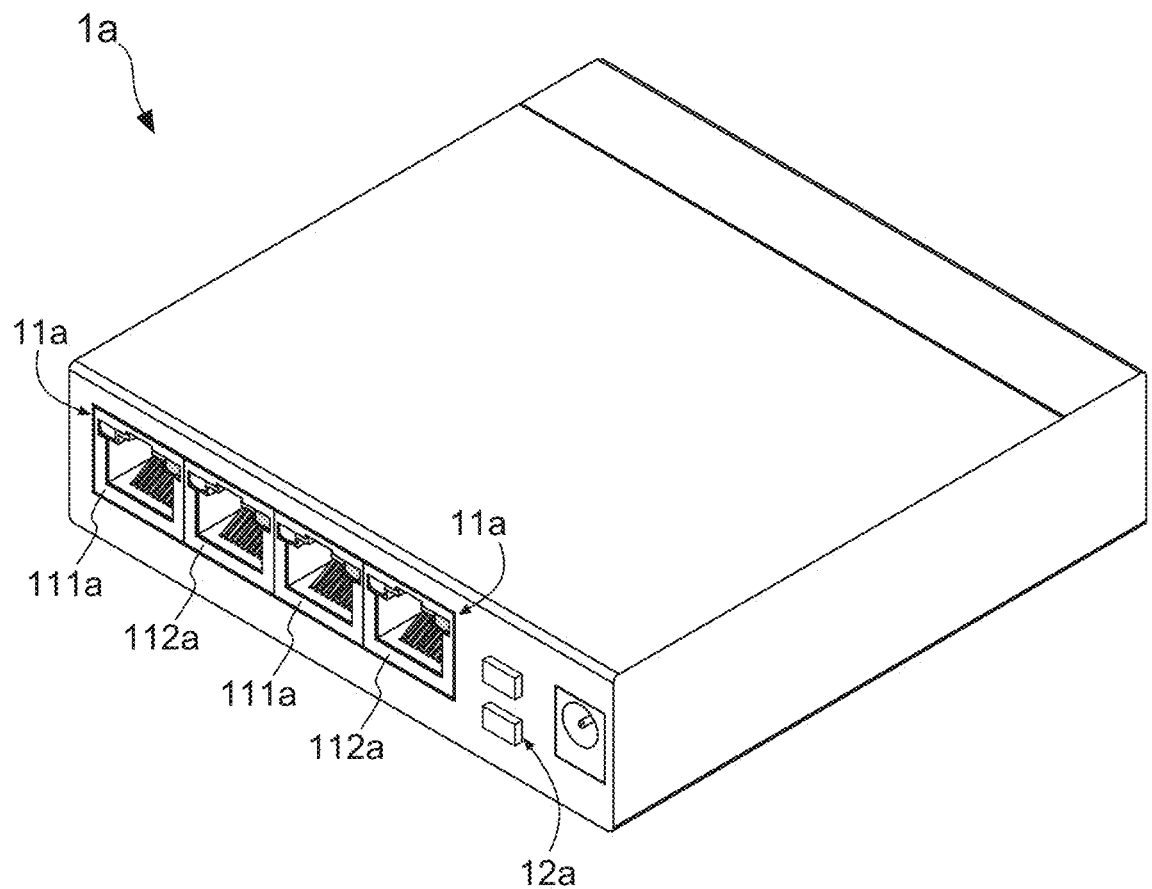
FIG. 3 shows a second stereo diagram of the conventional network appliance.
Figure 4:
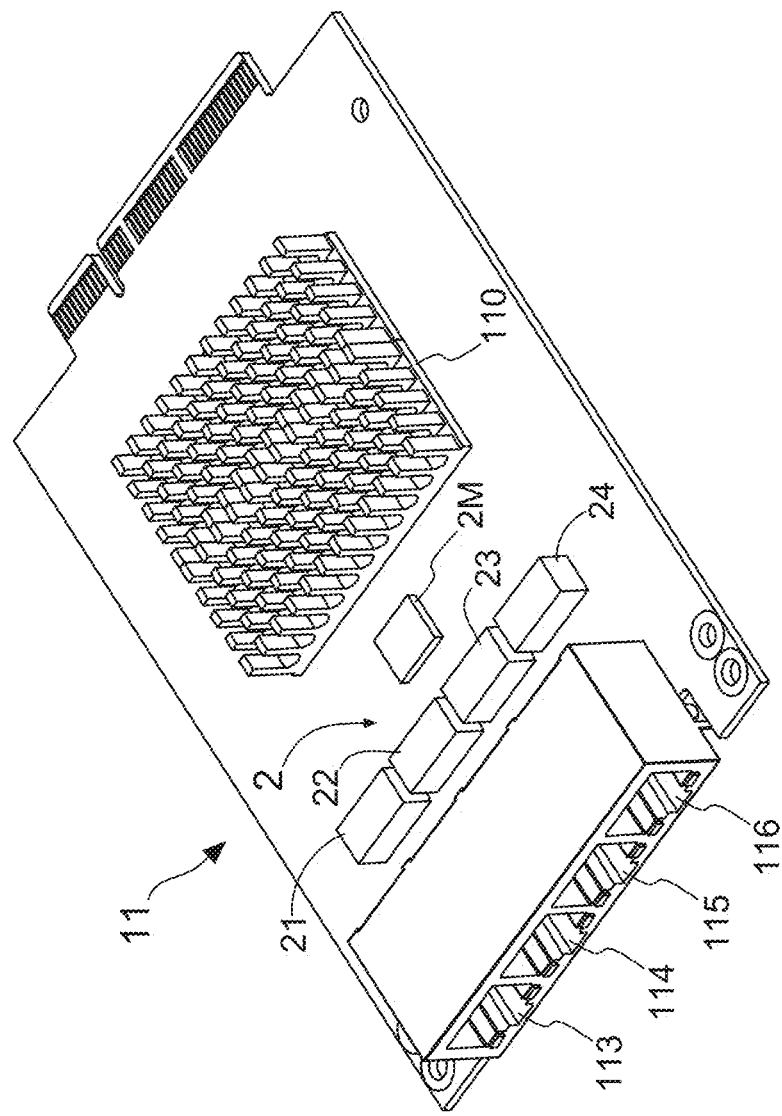
FIG. 4 shows a stereo diagram of an Ethernet network module including a bypass switch device with indicating function according to the present invention.

With reference to FIG. 4, there is shown a stereo diagram of an Ethernet network module including a bypass switch device with indicating function according to the present invention. As FIG. 4 shows, the Ethernet network module 11 commonly comprises a signal transmission controller 110, N number of transformers and N number of RJ45 connectors (113-116), wherein N is an integer equal to or greater than 2, and each said RJ45 connector (113-116) includes a first LED component and a second LED component. Particularly, in FIG. 4 there is a heat sink disposed on the signal transmission controller 110, and said transformer is integrated in said RJ45 connector. Herein, the present invention discloses a bypass switch device 2 with indicating function for being integrated in the Ethernet network module 11. As FIG. 4 shows, the bypass switch device 2 comprises N number of switch units (21-24) and a microcontroller 2M.

Figure 5:
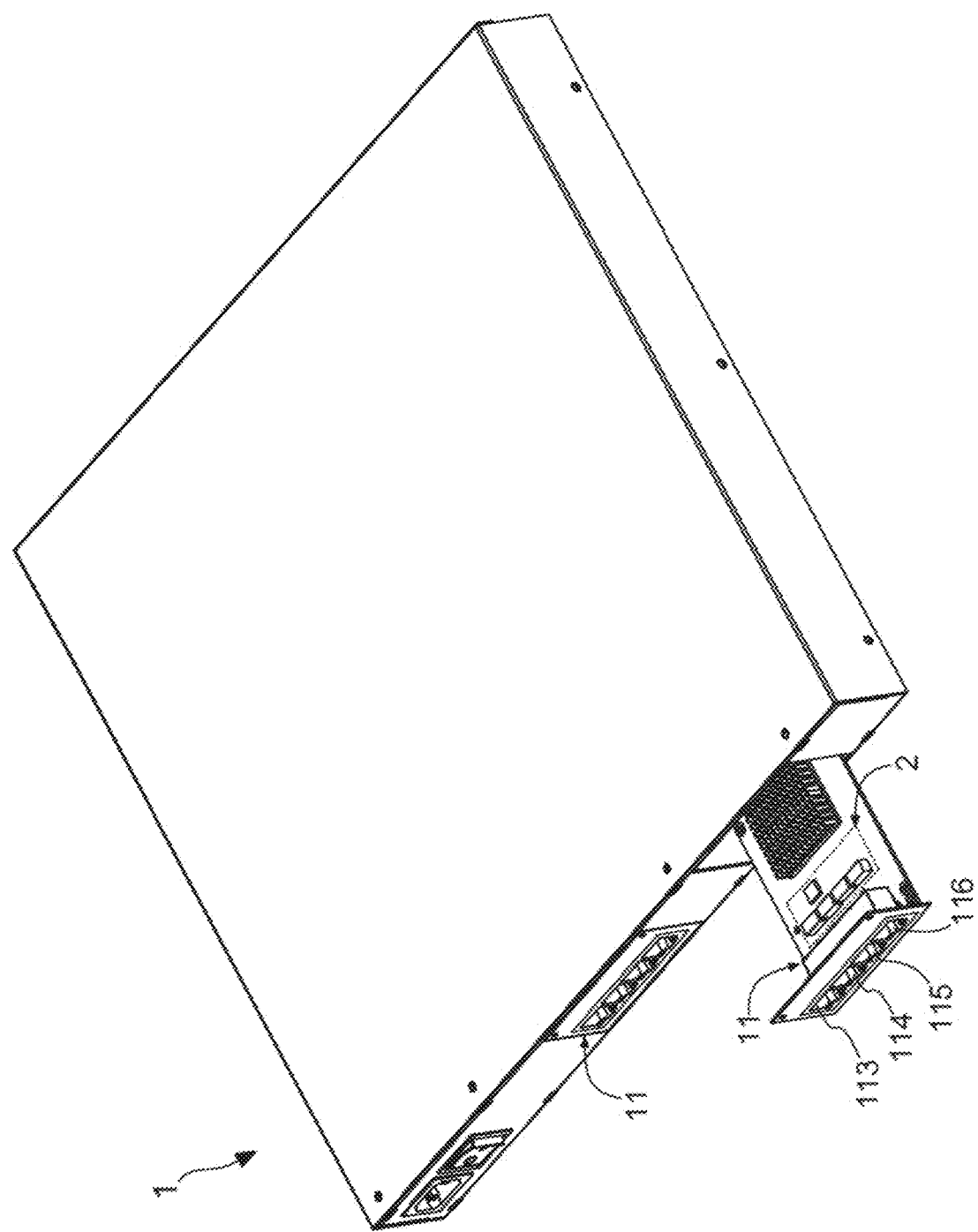
FIG. 5 shows a stereo diagram of a network appliance including at least one Ethernet network module according to the present invention.

On the other hand, FIG. 5 shows a stereo diagram of a network appliance including at least one Ethernet network module 11. It should be known that a network appliance 1, e.g., switch, router, gateway, and server, commonly includes at least one Ethernet network module 11 that has multiple RJ45 connectors (113-116). As described in more detail below, FIG. 5 depicts that the network appliance 1 is a switch including two Ethernet network modules 11. In other words, the present invention discloses a bypass switch device 2 with indicating function for use in a network appliance 1 having at least one Ethernet network module 11.

According to the present invention, each said switch unit (21-24) has a control terminal, a first terminal coupled to one said transformer, a second terminal coupled to one said RJ45 connector (113-116), and a third terminal coupled to one said switch unit (21-24). Moreover, the microcontroller 2M is coupled to the signal transmission controller 110 and the N number of RJ45 connectors (113-116), and is also coupled to N said control terminals of the N number of switch units (21-24). By such arrangements, in case the signal transmission controller fails to work normally due to thermal shutdown or sudden power loss, the microcontroller 2M immediately switches at least two said switch units (21-24) from a first switching state to a second switching state, so as to make at least two said RJ45 connectors (113-116) be allowed to directly communicate with each other. Simultaneously, the microcontroller 2M also lights up said first LED component belong to one of two said RJ45 connectors they directly communicate with each other as well as said second LED component belong to another one RJ45 connector, so as to indicate that the Ethernet network module 11 is working in a bypass mode.

Figure 6:
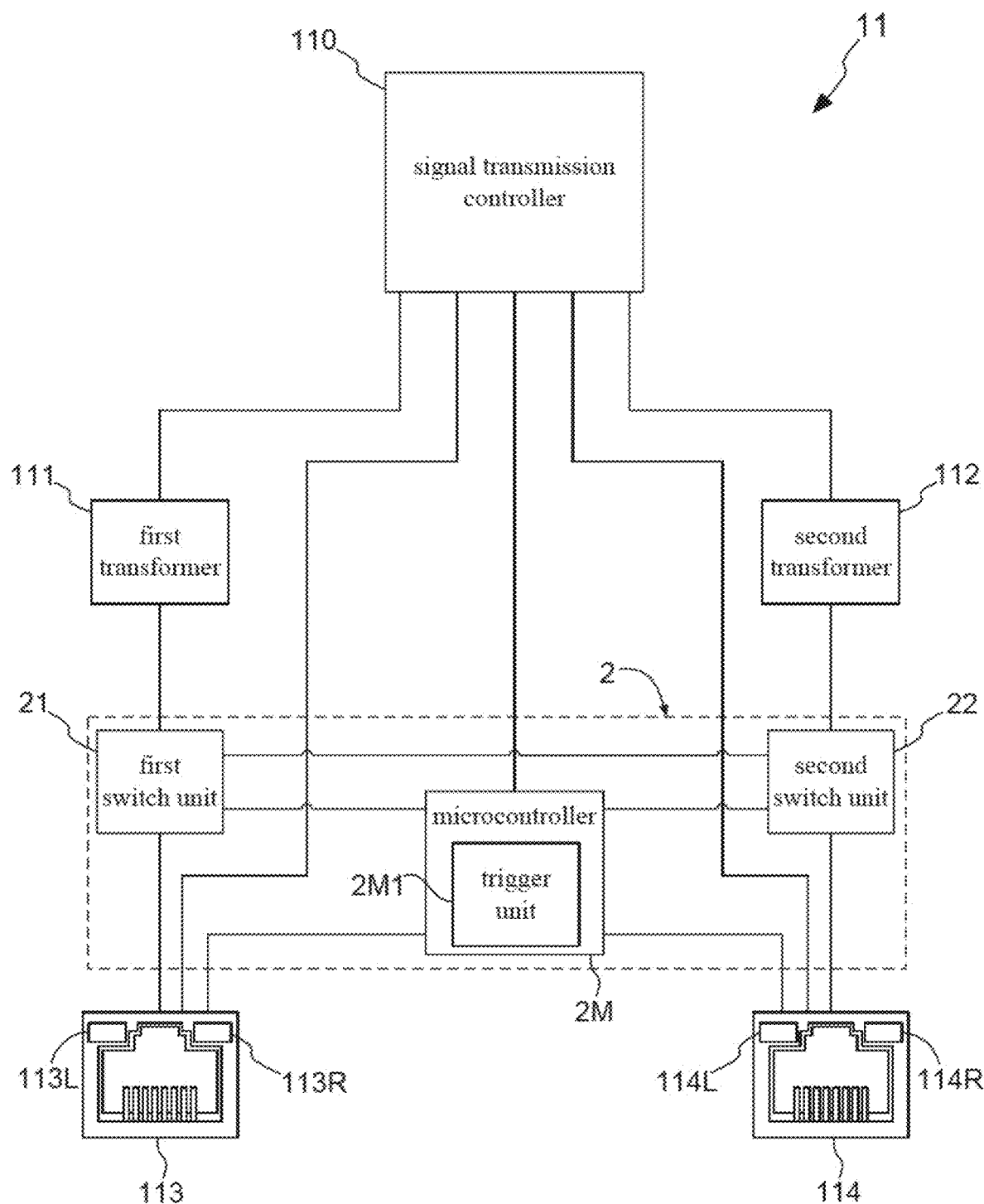
FIG. 6 shows a block diagram of the bypass switch device with indicating function according to the present invention.

With reference to FIG. 6, there is shown a block diagram of the bypass switch device 2 with indicating function according to the present invention. As FIG. 6 shows, in an exemplary embodiment the the Ethernet network module 11 comprises a signal transmission controller 110, a first transformer 111, a second transformer 112, a first RJ45 connector 113 including a right LED component 113R and a left LED component 113L, a second RJ45 connector 114 including a right LED component 114R and a left LED component 113L. On the other hand, the bypass switch device 2 of the present invention comprises a microcontroller 2M and a first switch unit 21 and a second switch unit 22.

When put the bypass switch device 2 into practice, the first switch unit 21 and the second switch unit 22 can both be a relay or a signal switching chip (e.g., multiplexer). As FIG. 6 shows, the first switch unit 21 has a control terminal, a first terminal coupled to the first transformer 111, a second terminal coupled to the first RJ45 connector 113, and a third terminal coupled to the second switch unit 22. On the other hand, the second switch unit 22 has a control terminal, a first terminal coupled to the second transformer 112, a second terminal coupled to the second RJ45 connector 114, and a third terminal coupled to the first switch unit 21. Moreover, the microcontroller 2M is coupled to the signal transmission controller 110, the first RJ45 connector 113 and the second RJ45 connector 114, and is also coupled to the two control terminals of the first switch unit 21 and the second switch unit 22.

As FIG. 5 and FIG. 6 show, after a first RJ45 connector plug is connected to the first RJ45 connector 113, the signal transmission controlling chip 110 controls the right LED component 113R to constantly emit a green light in case of the Ethernet network module 11 working normally. In such case, when the signal transmission controlling chip 110 transmits data to or receives data from the first RJ45 connector plug through the first RJ45 connector 113, the signal transmission controlling chip 110 controls the left LED component 113L to emit a flickering yellow, orange or green light. Herein, the signal transmission controlling chip 110 is a PHY chip or a chip integrated with MAC module and PHY module therein.

Similarly, after a second RJ45 connector plug is connected to the second RJ45 connector 114, the signal transmission controlling chip 110 controls the right LED component 114R to constantly emit a green light in case of the Ethernet network module 11 working normally. In such case, when the signal transmission controlling chip 110 transmits data to or receives data from the second RJ45 connector plug through the second RJ45 connector 114, the signal transmission controlling chip 110 controls the left LED component 114L to emit a flickering yellow, orange or green light.

It is worth noting that, the microcontroller 2M is integrated with a trigger unit 2M1 therein, and the trigger unit 2M1 is adopted for enabling the microcontroller 2M to switch the first switch unit 21 and the second switch unit 22 from a first switching state to a second switching state in case the signal transmission controller 110 fails to work normally due to thermal shutdown or sudden power loss. After being switched to be in the second switching state, the first switch unit 21 is allowed to directly communicate with the second switch unit 22, such that the Ethernet network module 11 is turned to work in a bypass mode. In such case, the microcontroller 2M simultaneously lights up the right LED component 113R belong to the first RJ45 connector 113 as well as the left LED component 114L belong to the second RJ45 connector 114, so as to indicate that the Ethernet network module 11 is working in the bypass mode. For example, the microcontroller 2M controls both the right LED component 113R of the first RJ45 connector 113 and the left LED component 114L of the second RJ45 connector 114 to emit light 2 times in time period of 2 seconds, for a specific time.

In one practicable embodiment, the trigger unit 2M1 is a watchdog timer for monitoring whether the microcontroller 2M periodically receive a specific signal from the signal transmission controller 110. As described in more detail below, during the normal working of the signal transmission controller 110, the microcontroller 2M is able to periodically receive a watchdog reset signal (e.g., a pulse signal) from the signal transmission controller 110. On the contrary, the microcontroller 2M fails to periodically receive the watchdog reset signal in case the signal transmission controlling chip 110 works abnormally due to thermal shutdown or sudden power loss. Therefore, the watchdog timer (i.e., the trigger unit 2M1) is configured for enabling the microcontroller 2M to switch the first switch unit 21 and the second switch unit 22 from the first switching state to the second switching state in case the signal transmission controller 110 fails to periodically transmit a watchdog reset signal to the microcontroller 2M.

In one practicable embodiment, the trigger unit 2M1 is a voltage detector for monitoring whether a working voltage supplied to the signal transmission controller 110 is in a normal range. For example, the working voltage for powering the signal transmission controller 110 (i.e., a PHY chip or a chip integrated with MAC module and PHY module) is commonly 2.5V or 3.3V. Moreover, it is imaginable that, the front-stage voltage regulator (e.g., LDO circuit) must fails to supply a normal working voltage to the signal transmission controller 110 when it is abnormal or has malfunction, causing the signal transmission controller 110 fail to normally work due to sudden power loss. Therefore, the voltage detector (i.e., the trigger unit 2M1) is configured for enabling the microcontroller 2M to switch the first switch unit 21 and the second switch unit 22 from the first switching state to the second switching state in case there is an abnormal working voltage supplied to the signal transmission controller 110.

As such, it does not need to change the design of the housing case of the network appliance 1 when integrating this novel bypass switch device 2 in any one Ethernet network module 11 included by the network appliance 1. In addition, there is no need to add any indicator light into the network appliance 1. In other words, the network appliance 1 and/or the Ethernet network module 11 are allowed to be kept the original design thereof.

Therefore, through the above descriptions, all embodiments of the bypass switch device for use in a network appliance having at least one Ethernet network module according to the present invention have been introduced completely and clearly. It is worth emphasizing that, the above description is made on embodiments of the present invention. However, the embodiments are not intended to limit the scope of the present invention, and all equivalent implementations or alterations within the spirit of the present invention still fall within the scope of the present invention.

What is claimed is:

1. A bypass switch device, being integrated in an Ethernet network module comprising a signal transmission controller, N number of transformers and N number of RJ45 connectors; wherein N is an integer equal to or greater than 2, each said RJ45 connector including a first LED component and a second LED component, and the bypass switch device comprising:
   N number of switch units, wherein each said switch unit has a control terminal, a first terminal coupled to one said transformer, a second terminal coupled to one said RJ45 connector, and a third terminal coupled to one said switch unit; and
   a microcontroller, being coupled to the signal transmission controller and the N number of RJ45 connectors, and being also coupled to N said control terminals of the N number of switch units;
   wherein the microcontroller is configured for:
   switching at least two said switch units from a first switching state to a second switching state in case the signal transmission controller fails to work normally, so as to make at least two said RJ45 connectors be allowed to directly communicate with each other; and
   simultaneously lighting up, in case of the two RJ45 connectors in communication with each other, said first LED component belong to one of the two RJ45 connectors and said second LED component belong to another of the two RJ45 connectors, so as to indicate that the Ethernet network module is working in a bypass mode;
   wherein the microcontroller is integrated with a trigger unit therein, and the trigger unit enabling the microcontroller to switch at least two said switch units from the first switching state to the second switching state in case the signal transmission controller fails to work normally;
   wherein the signal transmission controlling chip is a PHY chip or a chip integrated with a MAC module and a PHY module therein, and the trigger unit is selected from a group consisting of:
   a watchdog timer configured to monitor whether the microcontroller periodically receives a specific signal from the signal transmission controller, and
   a voltage detector configured to monitor whether a working voltage supplied to the signal transmission controller remains within a normal range.

2. The bypass switch device of claim 1, wherein said switch unit is selected from a group consisting of relay and signal switching chip.

3. An Ethernet network module, being integrated in a network appliance, and comprising a signal transmission controller, N number of transformers and N number of RJ45 connectors; wherein N is an integer equal to or greater than 2, and each said RJ45 connector including a first LED component and a second LED component; characterized in that the Ethernet network module further comprises a bypass switch device, and the bypass switch device comprising:
   N number of switch units, wherein each said switch unit has a control terminal, a first terminal coupled to one said transformer, a second terminal coupled to one said RJ45 connector, and a third terminal coupled to one said switch unit; and
   a microcontroller, being coupled to the signal transmission controller and the N number of RJ45 connectors, and being also coupled to N said control terminals of the N number of switch units;
   wherein the microcontroller is configured for:
   switching at least two said switch units from a first switching state to a second switching state in case the signal transmission controller fails to work normally, so as to make at least two said RJ45 connectors be allowed to directly communicate with each other; and
   simultaneously lighting up, in case of the two RJ45 connectors in communication with each other, said first LED component belong to one of the two RJ45 connectors and said second LED component belong to another of the two RJ45 connectors, so as to indicate that the Ethernet network module is working in a bypass mode;
   wherein the microcontroller is integrated with a trigger unit therein, and the trigger unit enabling the microcontroller to switch at least two said switch units from the first switching state to the second switching state in case the signal transmission controller fails to work normally;
   wherein the signal transmission controlling chip is a PHY chip or a chip integrated with a MAC module and a PHY module therein, and the trigger unit is selected from a group consisting of:
   a watchdog timer configured to monitor whether the microcontroller periodically receives a specific signal from the signal transmission controller, and
   a voltage detector configured to monitor whether a working voltage supplied to the signal transmission controller remains within a normal range.

4. The Ethernet network module of claim 3, wherein said switch unit is selected from a group consisting of relay and signal switching chip.

5. A network appliance, including at least one Ethernet network module comprising a signal transmission controller, N number of transformers and N number of RJ45 connectors; wherein N is an integer equal to or greater than 2, and each said RJ45 connector including a first LED component and a second LED component; characterized in that the network appliance further comprises a bypass switch device integrated in the Ethernet network module, and the bypass switch device comprising:
   N number of switch units, wherein each said switch unit has a control terminal, a first terminal coupled to one said transformer and a second terminal coupled to one said RJ45 connector, and a third terminal coupled to one said switch unit; and
   a microcontroller, being coupled to the signal transmission controller and the N number of RJ45 connectors, and being also coupled to N said control terminals of the N number of switch units;
   wherein the microcontroller is configured for:
   switching at least two said switch units from a first switching state to a second switching state in case the signal transmission controller fails to work normally, so as to make at least two said RJ45 connectors be allowed to directly communicate with each other; and
   simultaneously lighting up, in case of the two RJ45 connectors in communication with each other, said first LED component belong to one of the two RJ45 connectors and said second LED component belong to another of the two RJ45 connectors, so as to indicate that the Ethernet network module is working in a bypass mode;

wherein the microcontroller is integrated with a trigger unit therein, and the trigger unit enabling the microcontroller to switch at least two said switch units from the first switching state to the second switching state in case the signal transmission controller fails to work normally;

wherein the signal transmission controlling chip is a PHY chip or a chip integrated with a MAC module and a PHY module therein, and the trigger unit is selected from a group consisting of:

a watchdog timer configured to monitor whether the microcontroller periodically receives a specific signal from the signal transmission controller, and a voltage detector configured to monitor whether a working voltage supplied to the signal transmission controller remains within a normal range.

6. The network appliance of claim 5, wherein said switch unit is selected from a group consisting of relay and signal switching chip.

\* \* \* \* \*